Oct. 14, 1947.  J. M. GRAHAM ET AL  2,429,127
TREATING HYDROCARBON FLUIDS
Filed Aug. 24, 1943  2 Sheets-Sheet 1

John M. Graham
Edwin J. Gohr  Inventors
Charles W. Tyson
By _____ Attorney

Patented Oct. 14, 1947

2,429,127

UNITED STATES PATENT OFFICE 2,429,127

TREATING HYDROCARBON FLUIDS

John M. Graham, Plainfield, and Edwin J. Gohr and Charles W. Tyson, Summit, N. J., assignors to Standard Oil Development Company, a corporation of Delaware Application August 24, 1943, Serial No. 499,767

1 Claim. (Cl. 196—49)

This invention relates to catalytic conversion of hydrocarbons and more particularly relates to the production of aviation gasoline.

In the catalytic cracking of hydrocarbons to produce motor fuels, it is known that the cracked motor fuel has a relatively high acid heat due to the presence of olefins. While the catalytically cracked motor fuel has a higher octane number than thermally cracked gasoline, the catalytically cracked motor fuel or gasoline may not be sufficiently high in quality to be used as aviation gasoline. However, if the cracked gasoline fraction is retreated or again treated with a catalyst at a relatively high temperature, the catalytically cracked gasoline is improved in octane number, has a lower acid heat and may be used as an aviation gasoline or as aviation gasoline base stock.

The retreating step is usually carried out at a temperature lower than that used in the catalytic cracking of the gas oil or other heavy stock to produce motor fuel, and in order to produce aviation gasoline, highly active catalysts are preferably used.

According to our invention, fresh catalyst is used as make-up catalyst in the retreating step and used catalyst from the retreating step is transferred as make-up catalyst for the catalytic cracking or conversion of relatively heavy oils to produce motor fuel. The motor fuel may be used as such or may constitute all or a part of the feed to the retreating step. When using motor fuel or gasoline from the catalytic cracking step as feed for the retreating step, it is preferred to use two or more catalytic cracking units. By using two or more catalytic cracking units, the rate of addition of fresh catalyst to the retreating step is increased by two or three times or more the normal catalyst make-up requirement and in this way the catalyst in the retreating step is maintained at a higher activity level.

According to our invention, catalyst is recovered in slurry form in the bottom of the fractionating tower for the retreated products, and at least part of this slurry is used to provide make-up catalyst for the catalytic cracking first stage operation.

Figure 1:
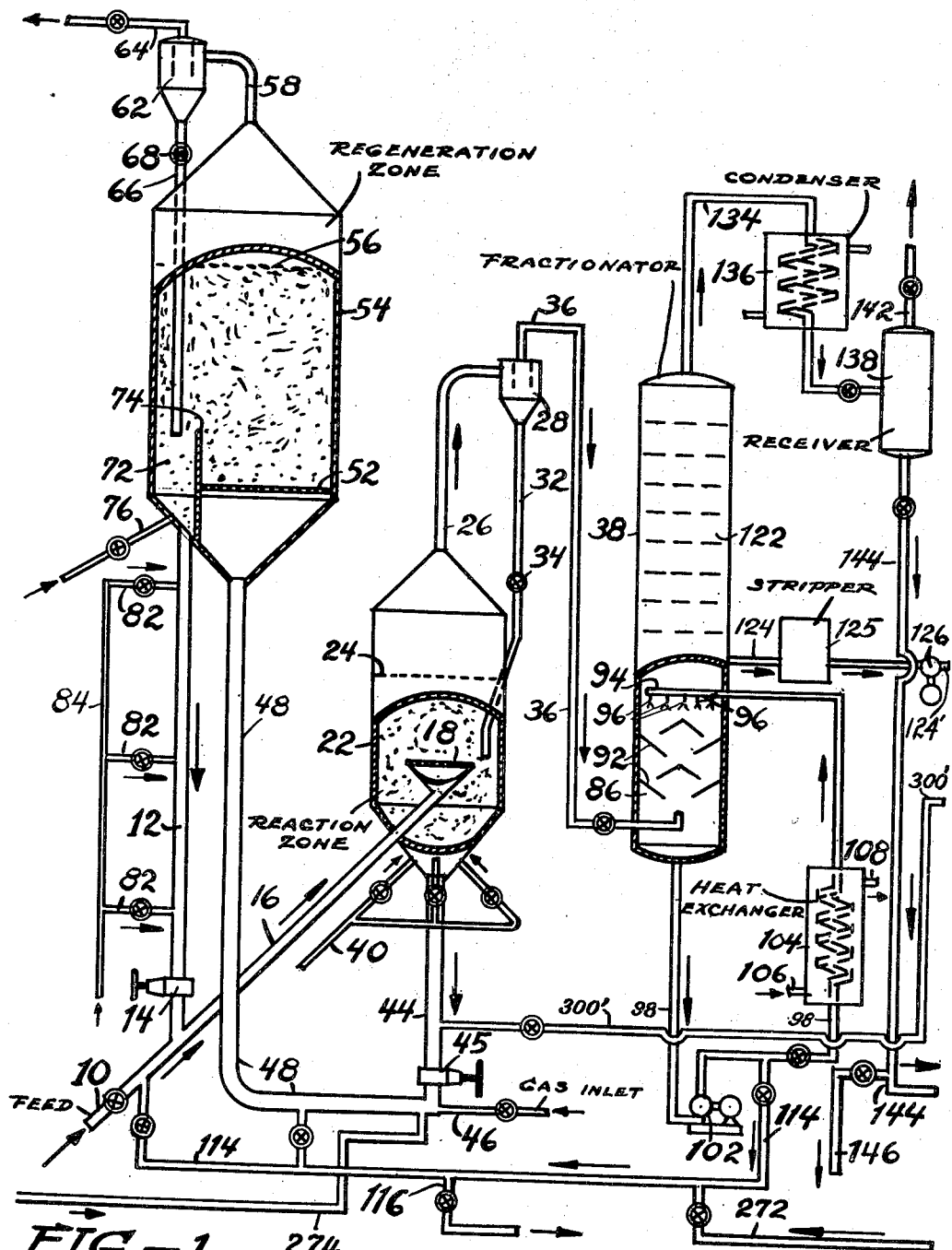
Figure 1A:
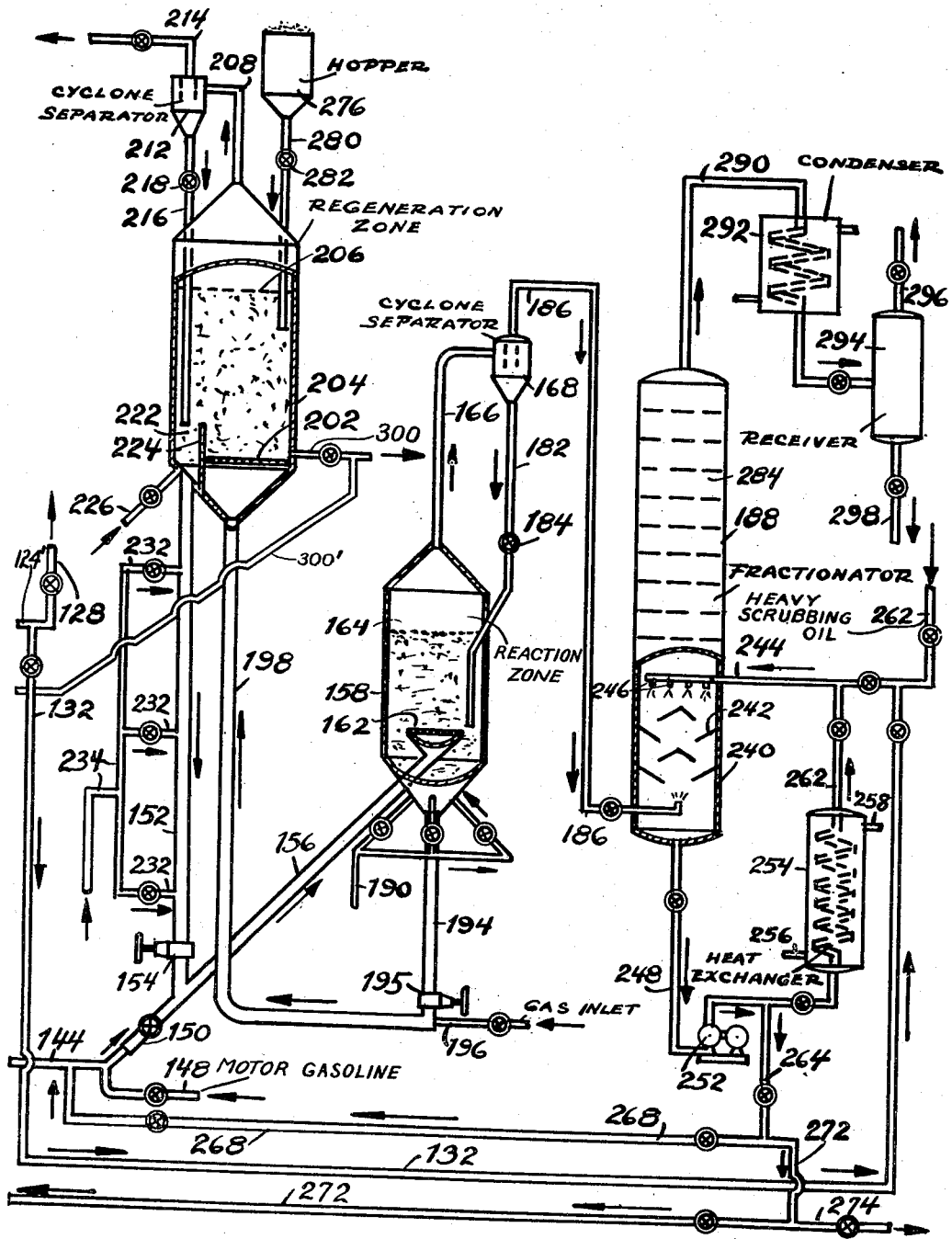

In the drawings, Figs. 1 and 1—A represent one form of apparatus which may be used to carry out our invention, Fig. 1—A being a continuation of Fig. 1.

Referring now to the drawing, reference character 10 designates a line through which the feed oil is passed. The feed oil may be a gas oil, whole reduced crude, or other relatively heavy hydrocarbon stock. Preferably the feed stock is preheated to a temperature of about 300° to 600° F. in any suitable manner as, for example, by indirect heat exchange with any desired hot products in the plant.

The partially heated feed stock is mixed with powdered catalyst introduced into line 10 from standpipe 12. The amount of powdered catalyst introduced into the line 10 is controlled by a slide valve 14. The catalyst may be any suitable cracking catalyst, such as acid-treated bentonites, but preferably synthetic silica-alumina gels are used because of their higher activity in the production of aviation gasoline. A sufficient amount of catalyst is used to vaporize the feed stock and raise it to conversion temperature. The catalyst in standpipe 12 is at a temperature of about 1000° to 1200° F.

The mixture of feed stock and powdered catalyst is passed through line 16 and through a distributor head 18 located in the lower portion of a reaction chamber 22. The distributor head is provided with openings to distribute the vaporized oil and powdered catalyst across the area of the reaction chamber 22. The velocity of the vapors passing upwardly through the reaction chamber is so selected that the powdered catalyst is fluidized or aerated, and assumes some of the characteristics of a liquid. In this fluidized condition the mass of catalyst particles is in a turbulent condition and has a level indicated at 24. The position of the level 24 may be changed if desired. In some instances it is desirable to introduce steam with the feed stock introduced into line 10.

The hydrocarbons are maintained in the reaction chamber 22 for the desired time at a temperature of about 850° to 1000° F. to effect the desired extent of conversion. The reaction products in vapor form pass overhead through line 26 to a cyclone separator 28 for separating entrained powdered catalyst from reaction product vapors. Other separating devices may be used in place of the cyclone separator shown in the drawing. Also, while only one cyclone separator has been shown on the drawing, it is to be understood that two or three cyclone separators may be used in series to insure better removal of the powdered catalyst from the reaction product vapors. The separated catalyst particles are withdrawn from the bottom of the cyclone separator 28 and passed through line 32 having a valve 34. The line 32 returns the catalyst to the reaction chamber 22 below the level 24 therein, and preferably to a point above the distributor head 18.

The reaction product vapors pass overhead from the cyclone separator 28 through line 36 and are introduced into the bottom portion of a fractionating tower 38 to be hereinafter described in greater detail.

During the cracking operation, carbonaceous material or coke is deposited on the catalyst particles, and before reusing them in another conversion operation, it is necessary to regenerate them. Before regeneration, entrained oil vapors are removed from the spent catalyst by admitting steam or other stripping gas through line 40 to the bottom section of reactor vessel 22. The steam vapors flow countercurrent to the catalyst particles and displace the hydrocarbon vapors therefrom. The dry spent catalyst particles are withdrawn from the bottom of the reaction chamber 22 through line 44 having control valve 45 and are mixed with a regeneration gas, such as air or other oxygen-containing gas, introduced through line 46. The dry mixture is then passed upwardly through line 48 and through grid member or distribution plate 52 in the bottom portion of a regeneration zone 54. The addition of the regenerating gas to the powdered catalyst forms a less dense mixture than that existing in the pipe 44 and reaction chamber 22, and the hydrostatic pressure developed by the head of fluidized catalyst in the reaction chamber 22 and pipe 44 is sufficient to force the spent catalyst to the regeneration zone 54.

The catalyst particles are maintained in the regeneration zone 54 as a fluidized mixture due to the proper selection of the velocity of the regenerating gas, and the fluidized mixture has a level 56 similar to that of a liquid. The catalyst particles are maintained in the regeneration zone 54 for a sufficient time to effect substantially complete regeneration of the catalyst particles. During regeneration the carbonaceous material or coke is burned off of the catalyst particles.

During regeneration, it is necessary to control the temperature to avoid excessively high temperatures which are deleterious to the catalyst. One way of controlling the temperature is to remove catalyst undergoing regeneration, cool the catalyst, and return it to the regeneration chamber 54. In another method, inert material is mixed and circulated with the catalyst and in this way the inert material absorbs the heat during regeneration and the temperature is controlled.

The regeneration gases pass overhead with entrained catalyst particles from the regeneration zone 54 and pass through line 58 to a separating means 62 for separating entrained catalyst particles from regeneration gases. In the drawing, the separating means is shown as a cyclone separator but other forms of separating means may be used. While one separating means has been shown in the drawing, it is to be understood that two or three separating means may be used in series, and as a last separating means, a Cottrell separator may be used. However, even when using a Cottrell precipitator, there is loss of catalyst with the outgoing regeneration gases, and it is necessary to replace the catalyst which is lost. The replacement of catalyst forms part of our invention and will be hereinafter described in greater detail.

The separated catalyst particles drop to the bottom of the separating means 62 and are withdrawn therefrom through line 66 having a valve 68 and introduced into withdrawal chamber 72 formed by partition 74 which extends above the grid member 52 and across the regeneration chamber 54. If desired, steam or hydrocarbon gas or other purging means may be introduced into the bottom of the withdrawal chamber 72 through line 76 and into the catalyst to purge the catalyst of entrapped oxygen.

From the withdrawal chamber 72 the powdered catalyst in regenerated and fluidized condition is passed to the standpipe 12 hereinbefore described. Fluidizing lines 82 fed from a manifold 84 are provided for introducing fluidizing gas into the standpipe 12 at spaced points for maintaining the powdered catalyst in fluidized condition. The hydrostatic pressure produced by the fluidized powered catalyst in the standpipe 12 and the fluidized catalyst undergoing regeneration in regeneration zone 54 is sufficient to introduce the powdered catalyst into the feed passing through line 10 and for passing the mixture to the reaction zone 22. If desired, a shutoff valve may be provided in the standpipe 12 above the slide valve 14 for shutting off the flow of catalyst in the case of an emergency.

Returning now to the fractionating tower 38, the hot vaporous reaction products from the reaction chamber 22 are introduced into the bottom of the fractionating tower 38 provided in its lower portion with a scrubbing chamber 86. The scrubbing chamber 86 is provided with baffles 92. A scrubbing oil is introduced above the baffles 92 through a line 94 having nozzles 96 so that the upwardly flowing reaction products are intimately contacted with the scrubbing oil. During the scrubbing, the temperature of the reaction products is reduced and heavier constituents are condensed. Also, during the scrubbing, residual catalyst particles are scrubbed out of the reaction products and the slurry of oil and catalyst particles is withdrawn from the bottom of the scrubbing zone through line 98. This slurry is pumped through line 98 by a pump 102 and through a cooling means 104 provided with an inlet 106 and an outlet 108 for the heat exchange medium. The cooling means 104 may be a waste heat boiler or may be a heat exchange device for preheating the feed which is introduced into the reaction chamber 22. The cooled heavy oil is then passed through line 94 and reintroduced into the scrubbing zone 86 to concentrate the slurry to the desired degree.

A portion of the slurry passing through line 98 may be passed through line 114 and recycled through line 10 for admixture with the feed stock. If desired, a portion of the cycle oil with the entrained catalyst may be withdrawn from line 114 through line 116 and removed from the system or may be returned to the regeneration zone 54 for supplying additional heat to the regeneration zone where insufficient amounts of carbonaceous material have been deposited on the catalyst particles in the cracking operation.

The lighter uncondensed vapors from the scrubbing zone 86 passed upwardly through the fractionating section 122 of the fractionating tower 38 and the vapors are fractionated to separate motor fuel from condensate oil. The condensate oil is withdrawn as a side stream from the lower portion of the fractionating section through line 124 and side stream stripper 125 and pumped through this line by pump 126. A portion or all of this stripped condensate oil, which comprises gas oil, may be withdrawn from the system through lines 124' and 128. All or a portion of the condensate oil may be passed through line 132 for use as a scrubbing oil in a second scrubbing zone later to be described.

The light vapors pass overhead from the fractionating tower 38 through line 134, are passed through a condenser 136, and then introduced into a gas separator 138 for separating gas from condensed hydrocarbons. The gases pass overhead through line 142 and the condensed hydrocarbons, which comprise motor gasoline, are withdrawn from the bottom of the gas separator through line 144. All or a part of the motor gasoline may be withdrawn from the system through line 146. The motor gasoline may be used as a feed for the retreating step about to be described. However, if the motor gasoline from the gas separator 138 is not used as this feed, other motor gasoline feed may be introduced through line 148.

The motor gasoline feed is introduced into a line 150 where it is mixed with hot regenerated powdered catalyst introduced into line 150 from standpipe 152. The standpipe 152 is provided with a slide valve 154 for controlling the amount of catalyst introduced into the line 150. The temperature of the motor gasoline is about 100°–600° F. The temperature of the regenerated catalyst is about 1000° to 1200° F. A sufficient amount of powdered catalyst is used to vaporize the motor gasoline feed to raise the temperature to the desired retreating level and to supply the heat of reaction necessary for retreating the gasoline.

The mixture is passed through line 156 and through a distribution head or grid member 162 located in the lower portion of retreating chamber 158. If desired, steam may be introduced along with the gasoline feed introduced into line 150. The velocity of the vapors and gases passing upwardly through the retreating chamber 158 is so selected that the powdered catalyst forms a fluidized mixture similar to a liquid. The fluidized mixture is in a turbulent condition and the temperature is substantially uniform throughout the mass. The fluidized mixture has a liquid-like level 164. While the level is shown in one position in the drawing, it is to be understood that the position of the level may be changed as desired.

The vaporous products are passed overhead from the retreating step are passed overhead from the retreating chamber 158 through line 166 and contain entrained catalyst. The vaporous products are introduced into a separating means 168 for separating entrained catalyst from vaporous products. Other separating means than cyclone separators may be used and preferably two or three separating means are used in series for more complete removal of entrained catalyst. The separated catalyst is withdrawn from the bottom of the separating means through line 182 having a valve 184 and returned to the body of the fluidized mixture in the retreating chamber 158, preferably above the level of the distributing head 162.

During retreating, the temperature is maintained at about 800° F. to 1000° F. and the vaporized motor gasoline is maintained in the retreating chamber for a time sufficient to transform olefins to aromatic compounds and for removing undesirable olefinic constituents which are objectionable in aviation gasoline.

The products of the retreating step in vapor form pass overhead from the separating means 168 through line 186 and are introduced into a scrubbing zone forming the lower portion of a second fractionating tower 188 which will be hereinafter described in greater detail.

During retreating, the catalyst particles become fouled with carbonaceous material or deposits of coke, and it is necessary to regenerate them before reusing them in another retreating step. Before regeneration entrained vapors are preferably removed from the spent catalyst by introducing steam or other stripping gas through line 190 into the bottom section of retreating chamber 158 below distributing head 162. The stripping gas flows upwardly countercurrent to the catalyst particles and displaces the hydrocarbon vapors therefrom. The fouled or spent catalyst particles are removed from the bottom of the retreating chamber 158 through line 194 having valve 195 and are mixed with a regenerating gas, such as air or other oxygen-containing gas introduced through line 196.

The mixture is passed upwardly through line 198 and through grid member or distribution plate 202 arranged in the bottom portion of a second regeneration zone 204. The velocity of the gases passing upwardly through the regeneration zone 204 is so selected that the powdered catalyst undergoing regeneration is maintained in a fluidized or aerated condition and assumes many of the characteristics of a liquid. The fluidized mixture is in a turbulent condition and has a level indicated at 206. The height of this level may be varied as desired.

The regeneration gases with entrained catalyst pass overhead through line 208 to a separating means 212 for separating entrained catalyst particles from regeneration gases. While a cyclone separator has been shown in the drawing as a separating means, it is to be understood that other separating means may be used. Also, it is preferable to use more than one separating means in series, and as a final separating means, a Cottrell precipitator is used. Even when using all the separating means there is some loss of catalyst with the outgoing regeneration gases, and in order to maintain the amount of catalyst substantially constant in the system, it is necessary to add make-up catalyst.

The recovered catalyst is withdrawn from the bottom of the separating means 212 through line 216 having a valve 218 and is returned to a withdrawal chamber 222 provided in a lower portion of the regeneration chamber 204 by a vertically extending partition 224 extending above the distribution plate 202 and across the regeneration chamber. Preferably steam, hydrocarbon gas, or other purging means is introduced into the bottom of the withdrawal chamber 222 through line 226 for purging the regenerated catalyst of residual oxygen.

The hot regenerated catalyst is introduced into the standpipe 152 before described. Any suitable fluidizing gas, such as steam, is introduced into the standpipe 152 through lines 232 fed by manifold 234. The hot regenerated catalyst is maintained in a relatively dense fluidized condition in the standpipe 152 and develops hydrostatic pressure sufficient for feeding the regenerated catalyst into line 150. If desired, a shut-off valve may be provided in standpipe 152 above the slide valve 154 for shutting off the flow of catalyst from the standpipe in the case of an emergency.

Returning now to the second fractionating tower 188, the retreated products in vapor form are introduced into a second scrubbing zone 240 provided with baffles 242 for providing intimate contact between the retreated vapors and a scrubbing oil introduced into the upper portion of the scrubbing zone through line 244 by means of nozzles 246. The retreated products contain entrained catalyst and in this scrubbing zone the entrained catalyst is scrubbed out. At the same time the temperature of the retreated products is reduced to about 450° to 600° F. and heavier constituents are condensed and removed as liquids from the retreated vapors.

The scrubbing oil containing the scrubbed out catalyst is withdrawn from the bottom of the scrubbing zone through line 248 and at least a portion thereof recycled through the scrubbing zone by means of pump 252. The oil slurry is passed through a heat exchanger 254 having an inlet 256 and an outlet 258 for the heat exchange medium. The cooled oil slurry is then returned to the scrubbing zone through line 244 to concentrate the slurry to the desired degree. The heat exchange means 254 may be a steam boiler or waste heat boiler or may be a heat exchanger for use in preheating either the feed stock going to the retreater or the feed stock going to the first mentioned reaction zone 22.

It is preferred to introduce a heavier oil as a scrubbing means and this heavier oil, such as virgin gas oil or cycle oil stock, is introduced through line 262 and used as a scrubbing oil. At least a portion of the slurry removed from the bottom of the scrubbing zone 240 is passed through line 264 and line 268 for recycling to the retreating zone 158. The slurry contains separated catalyst and by this means catalyst is returned to the retreating zone 158.

At least another portion of the slurry withdrawn from the bottom of the scrubbing zone 240 is passed through line 272 and recycled to the reaction chamber 22. This forms part of our invention in that the catalyst in the oil slurry is relatively fresh catalyst and is used as make-up catalyst for the reaction zone or chamber 22. As above pointed out, in the regeneration step some catalyst is inevitably lost from the regeneration zone and it is necessary to add make-up catalyst to maintain the amount of catalyst substantially constant in the cracking system. By using the partly used catalyst from the retreating zone as make-up for the cracking step, fresh catalyst is selectively added to the retreating step and in this way the activity of the catalyst in the retreating step is maintained at a higher level and better products are obtained.

If desired, a portion of the oil slurry withdrawn from the bottom of the scrubbing zone 240 may be withdrawn from the system through line 274 and a part or all of the withdrawn oil slurry may be returned to the regeneration zone 204 to supply additional heat thereto by burning of the oil. At the same time, the entrained catalyst or the catalyst in the oil slurry is recovered when the oil is burned. If desired, the oil slurry withdrawn through line 274 may be introduced into the first regeneration zone 54 for burning the oil to supply additional heat in the regeneration zone 54 when required.

Fresh catalyst is added as make-up catalyst for the retreating step from storage hopper 276 and line 280 having a valve 282. The line 280 preferably extends below the level of the catalyst in the regeneration zone 204. The powdered catalyst in the storage hopper 276 may be fluidized or made liquid-like to facilitate introduction into the regeneration zone 204 and to produce a fluidized mixture and aerated gas may be introduced into the powdered catalyst in the hopper 276. In addition, pressure may be applied to the fluidized catalyst in the hopper 276, if necessary, to force the powdered catalyst into the regeneration zone 204.

The uncondensed vapors in the retreating zone are passed through the fractionating section 284 of the fractionator 188 to separate aviation gasoline from the retreated products. The lighter vapors pass overhead through line 290, are partially condensed in a condenser 292 and passed through a separator 294 for separating gas from liquid. The gas passes overhead through line 296 and the liquid, which comprises aviation gasoline, is withdrawn through line 298. When using a silica-alumina gel as a catalyst in finely divided form between about 200 and 400 standard mesh or finer, the aviation gasoline withdrawn through line 298 has an aviation octane number of about 92-97. The boiling range of the aviation gasoline is about 90° F. to 325° F.

In carrying out our invention, it will be seen that the catalyst recovered in the scrubbing zones 86 and 240 comprises the finest portion of the powdered catalyst. This is due to the fact that in the cyclone separators the largest particles are separated out first. To overcome the objection of accumulation of fines or real fine catalyst, it may be desirable to remove in dry or other form, coarser catalyst from some part of the retreating unit as, for example, from the regenerator 204, and transfer this portion of the catalyst to the reaction chamber 22 or the regenerator 54. Coarser catalyst may be withdrawn from the bottom of the regeneration zone 204 through line 300, and this withdrawn catalyst may be supplied to the cracking step by being introduced into the reaction chamber 22 or the regeneration zone 54 in any suitable manner.

A specific example of the invention will now be given. A heavy oil feed stock, such as East or West Texas gas oil having an A. P. I. gravity of about 32° A. P. I. is preheated to a temperature of about 300° to 400° F. by suitable heat exchangers, such as, for example, heat exchanger 104 and/or heat exchanger 254. The preheated oil is mixed with hot regenerated catalyst from standpipe 12 in the ratio by weight of about 13 parts of catalyst to one part of oil. This ratio may be varied from about 5 parts of catalyst to one part of oil to 35 parts of catalyst to one part of oil. The catalyst is at a temperature of about 1150° F. The catalyst is preferably synthetically prepared silica-alumina gel having a particle size of about 200 to 400 standard mesh and finer.

The catalyst is at a sufficiently high temperature and used in a sufficient amount to vaporize the oil and to raise the oil to conversion temperature. In the reaction chamber 22 the oil vapors remain in the reactor for about 50 seconds while the catalyst remains in the reaction chamber for about 3 to 4 minutes.

The cracked vapors are passed to the scrubbing zone 86 and entrained catalyst is removed in an oil slurry which is used in part as recycle to the feed line 10 and in part as recycle scrubbing oil for the scrubbing zone 86.

The gas oil removed from the reaction products from the bottom of the fractionating section 122 may be used in part as the scrubbing oil for the second scrubbing zone 240 in the retreating step. The motor gasoline is separated from gases in the separator 138 and preferably forms the feed for the retreating step to produce aviation gasoline from the motor gasoline.

Because only part of the original feed stock is transformed into motor gasoline, it is preferable to use more than one cracking unit and preferably two or more cracking units are used. In the drawing, the cracking unit has been shown as about double the size of the retreating unit in order to make a simpler drawing. It is to be understood that two smaller cracking units may be used instead of the one larger one shown in the drawing. These two or more first stage units may operate on the same feed stock or on widely different feed stocks.

The motor gasoline passing through line 144 has an end point of about 400° F. and an octane number of about 80. This gasoline contains olefins which are objectionable in an aviation gasoline, and in order to produce aviation gasoline, the motor gasoline is retreated to remove undesirable olefinic constituents and to transform some olefins into aromatic compounds. The motor gasoline at a temperature of about 100° F. is mixed with powdered catalyst from standpipe 152. This catalyst is relatively fresh silica-alumina gel synthetically prepared, and the catalyst is at a temperature of about 1150° F. The same catalyst is used in the cracking step and in the retreating step. The amount of catalyst to oil is about 17 parts of catalyst to one part of oil by weight. The amount of catalyst used is sufficient to vaporize the motor gasoline and to raise it to a temperature of about 950° F. in the retreating zone 158.

In the retreating zone 158 the vapors remain for a period of about 40 seconds whereas the catalyst remains in the retreating zone for about 3 minutes. The retreated vapors are introduced into the second scrubbing zone 240 where they are scrubbed with gas oil or cycle oil which is preferably supplied from an extraneous source in order to recover heat from the retreated products. The heat is recovered in the heat exchanger 254.

The oil slurry withdrawn from the bottom of the second scrubbing zone 240 is used at least in part to supply make-up catalyst to the cracking step by passing the slurry through line 272. Aviation gasoline is recovered from the separator 294. This aviation gasoline has an R. V. P. of about 7 lbs. and an end point of about 325° F., an aviation octane number of about 96 and an acid heat of about 20 to 30.

In a large commercial unit the amount of catalyst lost from the regeneration side of the cracking step through line 64 amounts to about two tons a day and the amount of catalyst lost on the regeneration side of the retreating step through line 214 is about one ton a day. The make-up catalyst of three tons a day according to our invention is added to the regeneration zone or chamber 204 on the retreating side of the operation so that fresher catalyst is maintained on the retreating side. As make-up catalyst for the cracking side, about two tons of catalyst is supplied to the reaction chamber 22 through line 272, the oil slurry passing through line 272 being at least a portion of the oil slurry withdrawn from the retreating scrubbing zone 240.

While a preferred form of apparatus has been shown in the drawing and one example of a preferred operation has been given, it is to be understood that these are by way of illustration only and our invention is not limited thereto but variations and changes may be made without departing from the spirit of the invention.

We claim:

In a hydrocarbon conversion process using powdered catalyst in a cracking step and in a hydrocarbon product retreating step where catalyst regeneration zones are used for burning off carbonaceous material from fouled catalyst resulting from both of said steps, and wherein some catalyst is lost in the operation of both of said cracking and retreating steps, the steps of scrubbing the retreated vapors with a relatively heavy oil to remove entrained catalyst in slurry form and using at least part of the slurry to supply make-up catalyst to said cracking step by passing the slurry to the regeneration zone used for regenerating fouled catalyst resulting from said cracking step.

JOHN M. GRAHAM.
EDWIN J. GOHR.
CHARLES W. TYSON.

REFERENCES CITED

The following references are of record in the file of this patent:

UNITED STATES PATENTS

| Number | Name | Date |
|---|---|---|
| 2,235,133 | Zimmerman | Mar. 28, 1941 |
| 2,253,486 | Belchetz | Aug. 14, 1941 |
| 2,296,722 | Marancik et al. | Sept. 22, 1942 |
| 2,323,899 | Day et al. | July 13, 1943 |
| 2,325,611 | Keranen | Aug. 3, 1943 |
| 2,091,892 | Stratford | Aug. 31, 1937 |
| 2,339,874 | Nysewander | Jan. 25, 1944 |
| 2,358,888 | Thomas | Sept. 26, 1944 |
| 2,353,731 | Kanhofer | July 18, 1944 |
| 2,247,126 | Hemminger | June 24, 1941 |

FOREIGN PATENTS

| Number | Country | Date |
|---|---|---|
| 539,383 | Great Britain | Sept. 8, 1941 |